United States Patent
Homma et al.

(10) Patent No.: US 9,142,861 B2
(45) Date of Patent: Sep. 22, 2015

(54) LITHIUM IONIC CONDUCTOR AND FABRICATION METHOD THEREFOR, AND ALL-SOLID LITHIUM SECONDARY BATTERY

(71) Applicant: FUJITSU LIMITED, Kawasaki-shi, Kanagawa (JP)

(72) Inventors: Kenji Homma, Atsugi (JP); Tamotsu Yamamoto, Kawasaki (JP); Tsutomu Tanaka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 84 days.

(21) Appl. No.: 14/170,860

(22) Filed: Feb. 3, 2014

(65) Prior Publication Data
US 2014/0147753 A1 May 29, 2014

Related U.S. Application Data

(63) Continuation of application No. PCT/JP2011/068618, filed on Aug. 17, 2011.

(51) Int. Cl.
*H01M 10/052* (2010.01)
*H01M 10/0562* (2010.01)
*H01B 1/06* (2006.01)

(52) U.S. Cl.
CPC .............. *H01M 10/0562* (2013.01); *H01B 1/06* (2013.01); *H01M 10/052* (2013.01)

(58) Field of Classification Search
USPC ................................................ 429/188, 322
See application file for complete search history.

(56) References Cited

U.S. PATENT DOCUMENTS

2005/0107239 A1    5/2005   Akiba et al.

FOREIGN PATENT DOCUMENTS

| JP | 2003-22707 A | 1/2003 |
|---|---|---|
| JP | 2003-58361 A | 3/2003 |
| JP | 2003-208919 A | 7/2003 |
| JP | 2007-273214 A | 10/2007 |
| JP | 2009-193803 A | 8/2009 |
| JP | 2013080669 A * | 5/2013 |
| WO | WO 2009/101506 A1 | 8/2009 |

OTHER PUBLICATIONS

Ryoji Kanno et al., "Lithium Ionic Conductor Thio-LISICON", Journal of the Electrochemical Society, 148 (7), A742-A746 (2001).
M. Menetrier et al., "Ionic conduction in B2S3—Li2S—LiI glasses", Solid State Ionics 53-56 (1992) 1208-1213.
Kenji Hornma et al, "Crystal structure and phase transitions of the lithium ionic conductor Li3PS4", Solid State Ionics 182 (2011,) 53-58.
Kenji Homma et al., "Crystal structure of High-Temperature Phase of Lithium Ionic Conductor, Li3PS4", J. Phys. Soc. Jpn. 79(2010) Suppl. A, pp. 90-93.
International Search Report, mailed in connection with PCT/JP2011/068618 and mailed Sep. 27, 2011.

(Continued)

*Primary Examiner* — Tracy Dove
(74) *Attorney, Agent, or Firm* — Fujitsu Patent Center

(57) ABSTRACT

A lithium ionic conductor (solid electrolyte) contains lithium (Li), phosphorus (P), boron (B) and sulfur (S) as constituent elements and has a crystal structure that boron (B) is substituted for part of phosphorus (P) in the β structure of $Li_3PS_4$.

11 Claims, 11 Drawing Sheets

(56) References Cited

OTHER PUBLICATIONS

EESR—Extended European Search Report issued for European Patent Application No. 11870992.2, dated Mar. 17, 2015.
Zhang Z. et al.; "Synthesis and characterization of the B2S3—Li2S, the P2S5—Li2S and the B2S3—P2S5—Li2S glass systems"; Solid State Ionics; May 1, 1990; pp. 217-224; vol. 38, No. 3-4; North Holland Pub. Company. Amsterdam; NL. (XP024586567).
Tachez M. et al.; "Ionic conductivity of and phase transition in lithium thiophosphate Li3PS4", Solid State Ionics; Nov. 1, 1984; pp. 181-185; vol. 14, No. 3; North Holland Pub. Company. Amsterdam; NL. (XP025818434).
Vinatier P. et al.; "LI3BS3", ACTA Crystallographica; Section C Crystal Structure Communications; Aug. 15, 1994; pp. 1180-1183; vol. 50, No. 8; International Union of Crystallography; GB. (XP055174733).

* cited by examiner

| B Substitution amount | Framework structure | Space group | a (Å) | b (Å) | c (Å) | α, β, γ (°) | V (Å³) |
|---|---|---|---|---|---|---|---|
| x = 0.100 | Gamma | Pmn2₁ (31) | 7.74018 | 6.54940 | 6.10478 | 90 | 309.47 |
| x = 0.200 | Beta | Pnma (62) | 12.9326 | 8.07024 | 6.13951 | 90 | 640.77 |
| x = 0.300 | Beta | Pnma (62) | 12.9183 | 8.06803 | 6.13573 | 90 | 639.49 |
| x = 0.400 | Beta | Pnma (62) | 12.9160 | 8.04948 | 6.11202 | 90 | 635.44 |
| x = 0.600 | Beta | Pnma (62) | 13.1729 | 7.93478 | 6.12965 | 90 | 640.63 |
| x = 0.800 | Beta | Pnma (62) | 13.4137 | 7.80718 | 6.06664 | 90 | 635.48 |
| x = 1.000 | Beta | Pnma (62) | 13.7372 | 7.79486 | 6.12286 | 90 | 654.59 |

FIG. 5

| B Substitution amount | Li2S (g) | P2S5 (g) | B (g) | S (g) |
|---|---|---|---|---|
| x = 0.100 | 3.1533 | 4.5868 | 0.0481 | 0.2143 |
| x = 0.150 | 3.1940 | 4.4069 | 0.0728 | 0.3225 |
| x = 0.200 | 3.2428 | 4.2309 | 0.0973 | 0.4309 |
| x = 0.250 | 3.2857 | 4.0533 | 0.1217 | 0.5410 |
| x = 0.300 | 3.3330 | 3.8747 | 0.1481 | 0.6490 |
| x = 0.400 | 3.4231 | 3.5128 | 0.1953 | 0.8688 |
| x = 0.600 | 3.6095 | 2.7818 | 0.2954 | 1.3138 |
| x = 0.800 | 3.7965 | 2.0424 | 0.3960 | 1.7660 |
| x = 1.000 | 3.9875 | 1.2864 | 0.5006 | 2.2268 |
| x = 1.333 | 4.3142 | 0 | 0.6774 | 3.0135 |

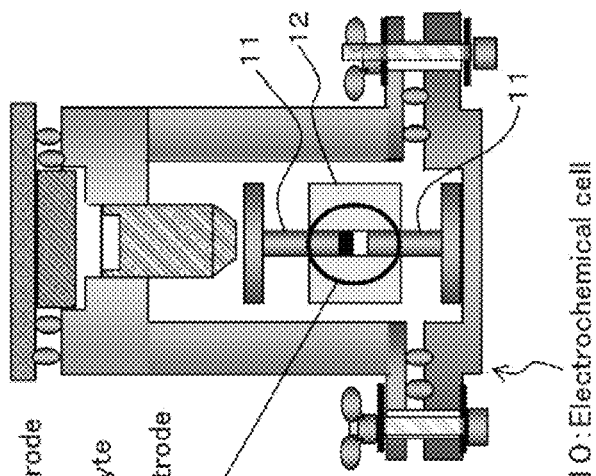
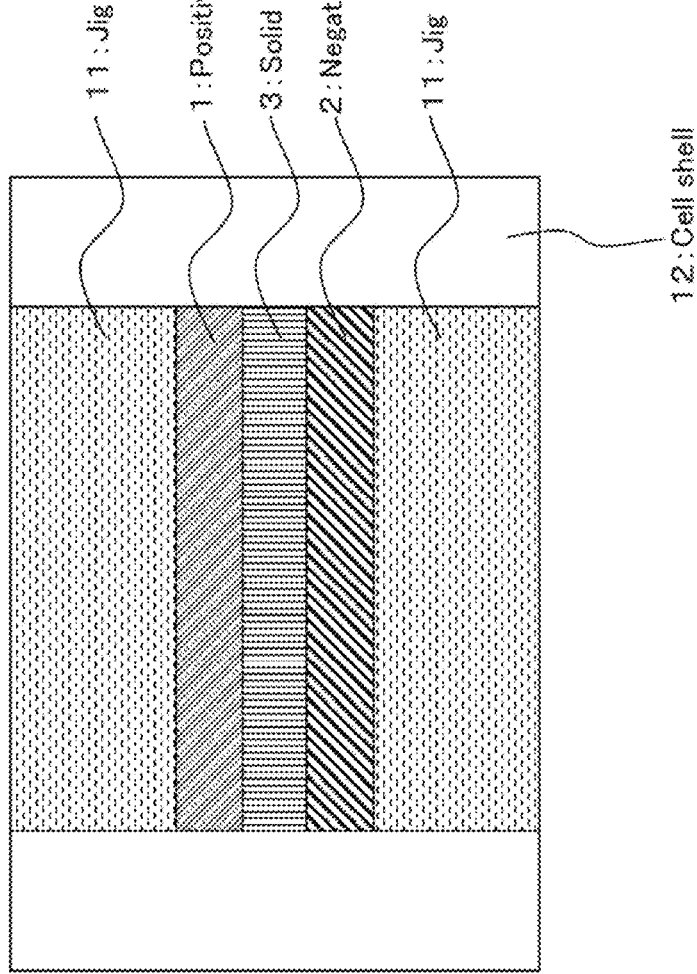

LITHIUM IONIC CONDUCTOR AND FABRICATION METHOD THEREFOR, AND ALL-SOLID LITHIUM SECONDARY BATTERY

CROSS-REFERENCE TO RELATED APPLICATION

This application is a continuation application of International Application PCT/JP2011/068618 filed on Aug. 17, 2011 and designated the U.S., the entire contents of which are incorporated herein by reference.

FIELD

The embodiments discussed herein are related to a lithium ionic conductor and a fabrication method therefor, and an all-solid lithium secondary battery.

BACKGROUND

A secondary battery that is safe and high in reliability in any terrestrial environment is requested for an environmental power generation technology by which electricity generated from microscopic energy such as sunlight, vibration or body temperature of humans or animals is accumulated and utilized for a sensor or as wireless transmission power.

As regards a liquid-based secondary battery used widely at present, it is a concern that, as a cycle of use is repeated, a positive electrode active material may degrade to decrease the battery capacity and the organic electrolyte in the battery may be ignited by battery short-circuiting caused by formation of dendrite.

Therefore, a secondary battery including a liquid-based electrolyte is poor in reliability and safety where it is intended to use the secondary battery for an environmental power generation device that is expected to be used, for example, for 10 years or more.

Therefore, attention is paid to an all-solid lithium secondary battery in which all constituent materials are solid. The all-solid lithium secondary battery is free from a risk of liquid leakage, firing or the like and is superior in a cycle characteristic.

For example, as solid electrolytes used for the all-solid lithium secondary battery, namely, as lithium ionic conductors, $Li_2S$—$B_2S_3$ based ($Li_3BS_3$), $Li_2S$—$P_2S_5$ based ($Li_7P_3S_{11}$, $Li_3PS_4$, $Li_8P_2S_6$ and so forth), $Li_2S$—$P_2S_5$—X (LiI, $B_2S_3$, $Al_2S_3$, $GeS_2$) based ($Li_{4-x}Ge_{1-x}P_xS_4$), $Li_2S$—$B_2S_3$—LiI based solid electrolytes and so forth are available. Also solid electrolytes having Li and S and having, as occasion demands, an element such as P, B or O ($Li_7P_3S_{11}$, $Li_2S$, $Li_3PO_4$—$Li_2S$—$B_2S_3$ based, $80Li_2S$-$20P_2S_5$ solid electrolytes and so forth) are available.

SUMMARY

The present lithium ionic conductor contains lithium (Li), phosphorus (P), boron (B) and sulfur (S) as constituent elements and has a crystal structure that boron (B) is substituted for part of phosphorus (P) in a β structure of $Li_3PS_4$.

The lithium ionic conductor has a composition represented by $Li_{3+3/4x}B_xP_{1-3/4x}S_4$ (0.155≤x≤1.300).

The present all-solid lithium secondary battery includes a positive electrode, a negative electrode, and a solid electrolyte provided between the positive electrode and the negative electrode and containing lithium (Li), phosphorus (P), boron (B) and sulfur (S) as constituent elements, the solid electrolyte having a crystal structure that boron (B) is substituted for part of phosphorus (P) in a β structure of $Li_3PS_4$.

The present all-solid lithium secondary battery includes a positive electrode, a negative electrode, and a solid electrolyte provided between the positive electrode and the negative electrode, and having a composition represented by $Li_{3+3/4x}B_xP_{1-3/4x}S_4$ (0.155≤x≤1.300).

The present fabrication method for a lithium ionic conductor includes mixing lithium (Li), phosphorus (P), boron (B) and sulfur (S), melting the mixture by heating and then cooling the mixture to form a burned body and reducing the burned body to powder and then burning the powder again at a temperature at which the powder does not melt to fabricate a lithium ionic conductor having a crystal structure that boron (B) is substituted for part of phosphorus (P) in a β structure of $Li_3PS_4$.

The present fabrication method for a lithium ionic conductor includes mixing lithium (Li), phosphorus (P), boron (B) and sulfur (S), melting the mixture by heating and then cooling the mixture to form a burned body and reducing the burned body to powder and then burning the powder again at a temperature at which the powder does not melt to fabricate a lithium ionic conductor having a composition represented by $Li_{3+3/4x}B_xP_{1-3/4x}S_4$ (0.155≤x≤1.300).

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a view depicting weighing values of several raw materials where lithium ionic conductors (solid electrolytes) of examples and comparative examples are fabricated.

FIGS. 10A and 10B are views illustrating a fabrication method for the all-solid lithium secondary batteries of the examples.

DESCRIPTION OF EMBODIMENTS

Figure 1:
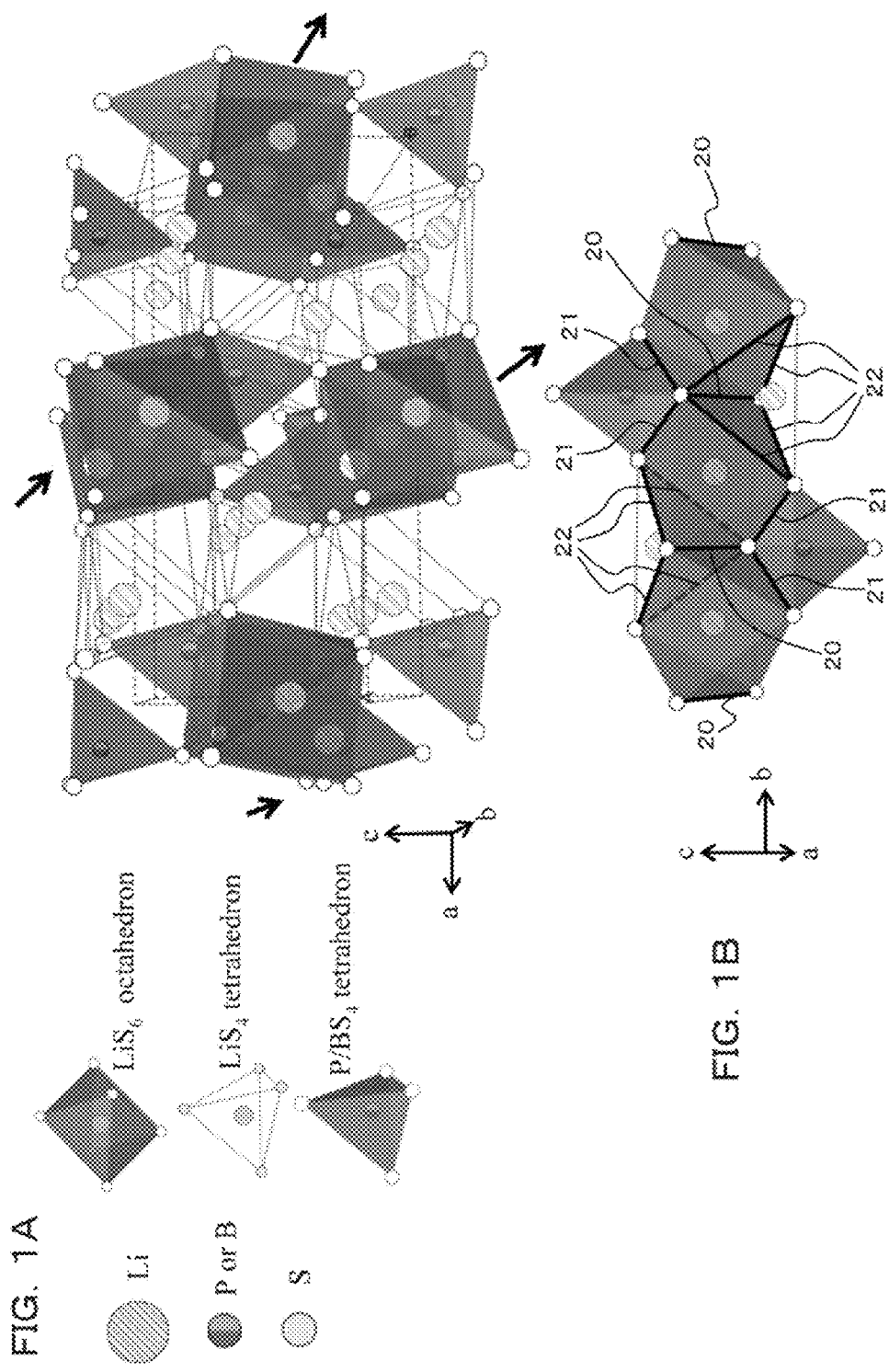
FIGS. 1A and 1B are schematic views depicting a configuration of a lithium ionic conductor (solid electrolyte) according to a present embodiment.

Incidentally, in order to improve an output characteristic (load characteristic) of an all-solid lithium secondary battery, it is desirable to reduce the internal resistance of the same. The internal resistance of the all-solid lithium secondary battery depends much upon the ionic conductivity of the solid electrolyte, namely, of the lithium ionic conductor. Therefore, in order to decrease the internal resistance of the all-solid lithium secondary battery to improve the output characteristic of the same, it is desirable to improve the ionic conductivity of the solid electrolyte, namely, of the lithium ionic conductor.

Especially, the crystal structure of the lithium ionic conductor is one of factors that greatly vary the ionic conductivity.

For example, as $Li_2S$—$P_2S_5$ based conductors, conductors of various compositions and various crystal structures such as $Li_7P_3S_{11}$, $Li_3PS_4$ and $Li_8P_2S_6$ are available.

Among them, $Li_3PS_4$ has at least crystal structures of γ and β and indicates one of the crystal structures in response to a temperature from room temperature (for example, from approximately 25° C.) to approximately 700° C. of the melting point. For example, the crystal structure of $Li_3PS_4$ is the γ structure at a temperature from approximately 24° C. to approximately 270° C., and is the β structure at a temperature from approximately 364° C. to approximately 451° C. In other words, the crystal structure of $Li_3PS_4$ changes from the γ structure to the β structure within the range of temperature from approximately 270° C. to approximately 364° C. It is to be noted that the γ structure and the β structure are hereinafter referred to sometimes as γ phase and β phase, respectively. Further, a change of the crystal structure is hereinafter referred to sometimes as phase change or phase transition.

Here, among three kinds of crystal structure of $Li_3PS_4$, the γ structure indicates a low ionic conductivity while the β structure indicates a high ionic conductivity.

However, as described above, while the crystal structure of $Li_3PS_4$ is the β structure having a high ionic conductivity at a temperature from approximately 364° C. to approximately 451° C., the crystal structure is the γ structure having a low ionic conductivity at a temperature from approximately 24° C. to approximately 270° C.

In this manner, a lithium ionic conductor in which the crystal structure of $Li_3PS_4$ at room temperature is the β structure having a high ionic conductivity cannot be implemented.

Therefore, it is desired to implement a lithium ionic conductor, namely, a solid electrolyte for an all-solid lithium secondary battery, in which the crystal structure of $Li_3PS_4$ at room temperature is the β structure having a high ionic conductivity. Further, it is desired to improve the ionic conductivity at room temperature of the lithium ionic conductor, namely, of the solid electrolyte of the all-solid lithium secondary battery, and reduce the internal resistance of the all-solid lithium secondary battery to improve an output characteristic of the all-solid lithium secondary battery.

In the following, a lithium ionic conductor and a fabrication method therefor as well as an all-solid lithium secondary battery according to an embodiment are described with reference to FIGS. 1A to 4.

Figure 3:
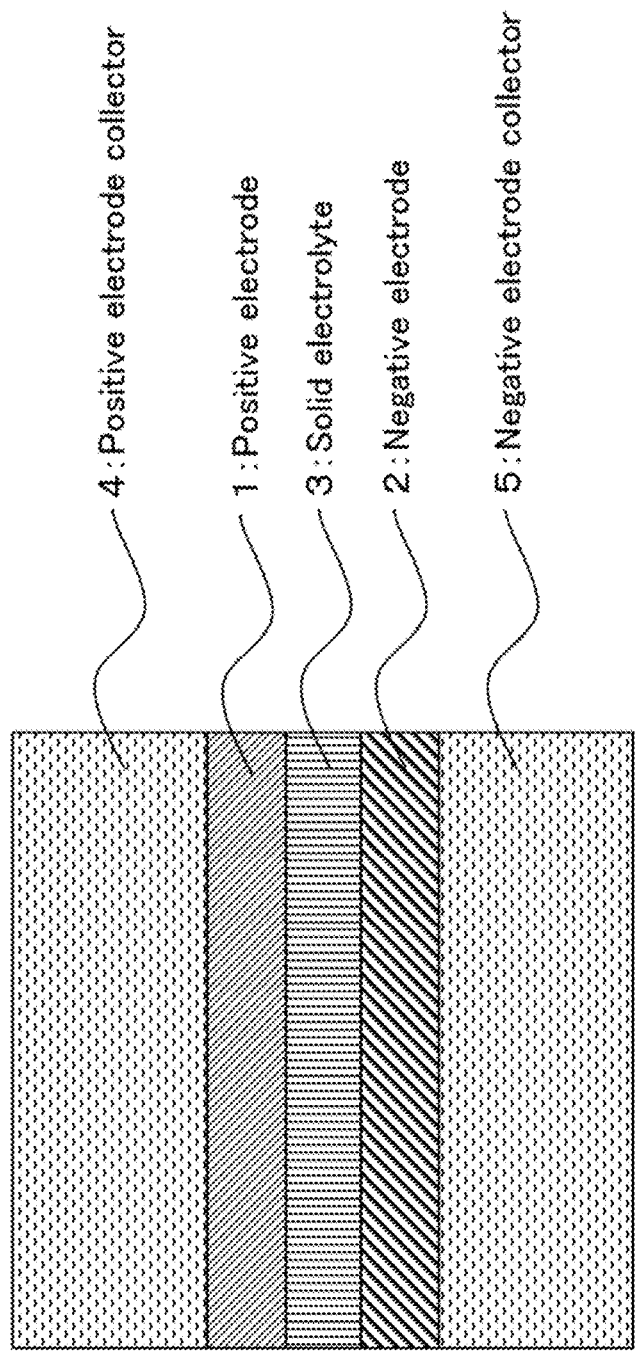
FIG. 3 is a schematic sectional view depicting a configuration of an all-solid lithium secondary battery according to the present embodiment.

As depicted in FIG. 3, the all-solid lithium secondary battery according to the present embodiment includes a positive electrode 1, a negative electrode 2, a solid electrolyte 3 provided between the positive electrode 1 and the negative electrode 2, and a positive electrode collector 4 and a negative electrode collector 5 provided sandwiching the constituent elements 1 to 3 therebetween. Preferably, such an all-solid lithium secondary battery as just described is incorporated, for example, in an environmental power generation apparatus.

Here, the positive electrode 1 contains a positive electrode active material. Here, the positive electrode 1 contains, for example, $LiCoO_2$ as the positive electrode active material. In particular, the positive electrode 1 is configured from a material produced by mixing $LiCoO_2$ and a solid electrolyte material at a ratio of 6:4.

The negative electrode 2 contains a negative electrode active material. Here, the negative electrode 2 contains, for example, Li—Al as the negative electrode active material. In particular, the negative electrode 2 is configured from a material produced by mixing Li—Al (alloy) and a solid electrolyte material at a ratio of 7:3.

The solid electrolyte 3 is a lithium ionic conductor and contains lithium (Li), phosphorus (P), boron (B) and sulfur (S) as constituent elements as depicted in FIG. 1A, and has a crystal structure that boron (B) is substituted for part of phosphorus (P) of the β structure of $Li_3PS_4$. It is to be noted that the β structure is hereinafter referred to sometimes as β phase, β type crystal structure or β crystal structure.

Here, as depicted in FIG. 1B, the β structure of $Li_3PS_4$ is a crystal structure in which six-coordinated octahedrons ($LiS_6$ octahedrons) centering on lithium (Li) are located at a position at which they share an edge 20. In particular, the β structure of $Li_3PS_4$ is a crystal structure in which the six-coordinated octahedrons centering on lithium (Li) share the edges 20 and the shared edges 20 are juxtaposed in series along a b-axis direction. Here, a plurality of $LiS_6$ octahedrons continue linearly along the b-axis direction of the crystal structure and configure a one-dimensional chain ($LiS_6$ octahedral complex). The shared edges 20 are located on a line along the b-axis direction of the crystal structure and overlap with each other along the b-axis direction. Therefore, as indicated by an arrow mark in FIG. 1A, a one-dimensional conduction path (linear conduction path; ionic conduction path) exists. It is to be noted that, in FIG. 1B, the shared edges 20 to 22 are indicated by thick solid lines and thick broken lines.

Further, as depicted in FIG. 1A, the β structure of $Li_3PS_4$ is a crystal structure in which one half of apexes of a plurality of four-coordinated tetrahedrons (P/$BS_4$ tetrahedrons) centering on boron (B) or phosphorus (P) face the opposite direction in a unit cell indicated by broken lines in FIG. 1A. In particular, the β structure of $Li_3PS_4$ is a crystal structure in which the directions of the apexes of the four-coordinated tetrahedrons centering on boron (B) or phosphorus (P) are distributed ½ by ½ in the opposite directions (here, in the upward and downward directions) in a unit cell. It is to be noted that the four-coordinated tetrahedrons centering on boron (B) are $BS_4$ tetrahedrons, namely, four-coordinated tetrahedron borate $(BS_4)^{5-}$, and the four-coordinated tetrahedrons centering on phosphorus (P) are $PS_4$ tetrahedrons, namely, four-coordinated tetrahedron sulfate $(PS_4)^{3-}$.

Further, as depicted in FIG. 1B, the β structure of $Li_3PS_4$ is a crystal structure in which four-coordinated tetrahedrons (P/$BS_4$ tetrahedrons) centering on boron (B) or phosphorus (P) and six-coordinated octahedrons ($LiS_6$ octahedrons) centering on lithium (Li) are located at a position at which they share an edge 21. Further, as depicted in FIG. 1B, the β structure of $Li_3PS_4$ is a crystal structure in which four-coordinated tetrahedrons ($LiS_4$ tetrahedrons) centering on lithium (Li) and six-coordinated octahedrons ($LiS_6$ octahedrons) centering on lithium (Li) are located at a position at which they share an edge 22. Further, though not depicted, the β structure of $Li_3PS_4$ is a crystal structure in which four-coordinated tetrahedrons (P/BS$_4$ tetrahedrons) centering on boron (B) or phosphorus (P) and four-coordinated tetrahedrons (LiS$_4$ tetrahedrons) centering on lithium (Li) are located such that they share an edge. It is to be noted that four-coordinated tetrahedrons (LiS$_4$ tetrahedrons) centering on lithium (Li) and six-coordinated octahedrons (LiS$_6$ octahedrons) centering on lithium (Li) share a face. Further, since four-coordinated tetrahedrons (LiS$_4$ tetrahedrons) centering on lithium (Li) and six-coordinated octahedrons (LiS$_6$ octahedrons) centering on lithium (Li) share an edge (share a face), there is the possibility that they may function as a conduction path.

In this manner, the β structure of $Li_3PS_4$ is a crystal structure in which four-coordinated tetrahedrons centering on boron (B) or phosphorus (P) and four-coordinated tetrahedrons centering on lithium (Li), four-coordinated tetrahedrons centering on boron (B) or phosphorus (P) and six-coordinated octahedrons centering on lithium (Li), and four-coordinated tetrahedrons centering on lithium (Li) and six-coordinated tetrahedrons centering on lithium (Li) are located such that they share an edge.

Figure 2:
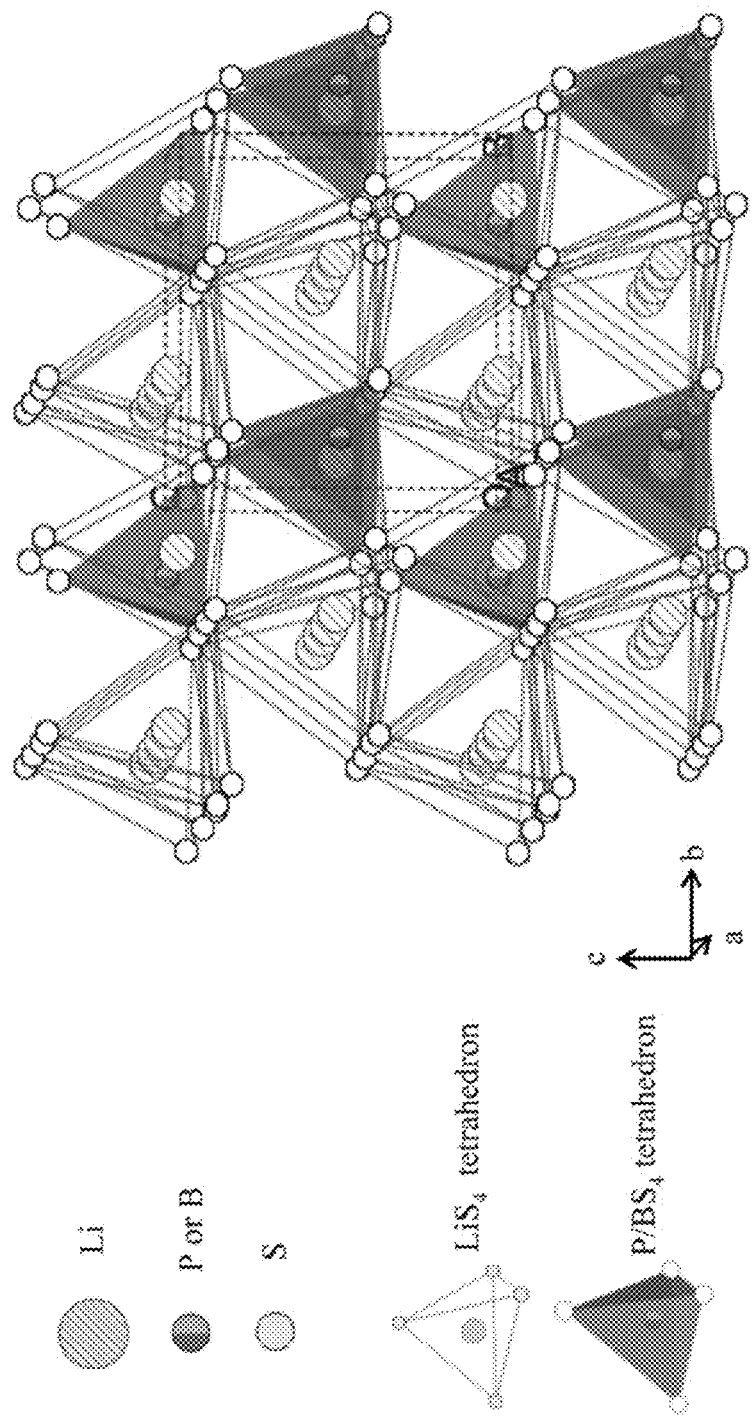
FIG. 2 is a schematic view depicting a crystal structure in which boron (B) is substituted for part of phosphorus (P) in a γ structure of $Li_3PS_4$.

In this manner, since, in the crystal structure (polymorphic crystal structure) of $Li_3PS_4$, in the β structure, the octahedrons centering on lithium (Li) exist in a state in which they share an edge and a one-dimensional ionic conduction path is constructed, an ionic conductivity higher than that of a γ structure hereinafter described is indicated. On the other hand, as depicted in FIG. 2, in the γ structure, lithium (Li) and phosphorus (P) that are conductive carriers exist at the position of the center of a tetrahedron, and the tetrahedrons, namely, a PS$_4$ tetrahedron and an LiS$_4$ tetrahedron, share an apex. Further, in the γ structure, all of the apex directions of the tetrahedrons are directions (here, upward direction) same as each other and no edge is shared, and a one-dimensional chain or a planar ionic conduction path does not exist. Therefore, the ionic conductivity is low.

It is to be noted that, in the β structure of $Li_3PS_4$ that boron (B) is substituted for part of phosphorus (P), boron (B) is located at part of P sites in the β structure of $Li_3PS_4$ and the crystal structure is same as that of the β structure of $Li_3PS_4$. As regards the β structure of $Li_3PS_4$, namely, as regards the β structure of $Li_3PS_4$ that boron (B) is not substituted for part of phosphorus (P), for example, Kenji Homma et al., "Crystal structure and phase transitions of the lithium ionic conductor Li3PS4", Solid State Ionics 182 (2011) 53-58, the entire content of which is incorporated herein by reference, is referred to.

Incidentally, the solid electrolyte (lithium ionic conductor) 3 having such a crystal structure as described above can be fabricated in the following manner.

In particular, lithium (Li), phosphorus (P), boron (B) and sulfur (S) are first mixed and melted by heating and then cooled to form a burned body.

Then, the burned body is reduced to powder and then burned at a temperature at which it does not melt thereby to fabricate the solid electrolyte (lithium ionic conductor) 3. It is to be noted that the reason why the heat treatment is performed at a temperature at which the burned body does not melt is that it is intended to stabilize the β structure.

The solid electrolyte (lithium ionic conductor) 3 fabricated in this manner has a crystal structure that boron (B) is substituted for part of phosphorus (P) in the β structure of $Li_3PS_4$ as described hereinabove. In particular, the solid electrolyte (lithium ionic conductor) 3 fabricated in such a manner as described above has, based on powder X-ray diffraction data (refer to FIG. 6) in examples hereinafter described, a composition represented by $Li_{3+3/4x}B_xP_{1-3/4x}S_4$ ($0.2 \leq x \leq 1.0$).

In the solid electrolyte (lithium ionic conductor) 3 having such a crystal structure as described above, the crystal structure does not change by a temperature variation as proved by the examples (refer to FIG. 7) hereinafter described. In other words, also at room temperature (for example, around 25° C.), the β structure having a high ionic conductivity can exist in stability.

In this manner, the solid electrolyte (lithium ionic conductor) 3 that has the β structure having a high ionic conductivity at room temperature can be implemented. In particular, by substituting boron (B) for part of phosphorus (P) in the crystal structure of $Li_3PS_4$, the γ structure that is a crystal structure having a low ionic conductivity at room temperature can be changed to the β structure that indicates a high ionic conductivity. Consequently, the ionic conductivity of the solid electrolyte (lithium ionic conductor) 3 at room temperature can be improved. It is to be noted that the γ structure is hereinafter referred to sometimes as γ phase, γ type crystal structure or γ crystal structure.

It is to be noted that the β structure indicates different lattice constants between a case in which the crystal structure is the β structure at room temperature and another case in which the crystal structure is the β structure at a high temperature.

Figures 4A, 4B:
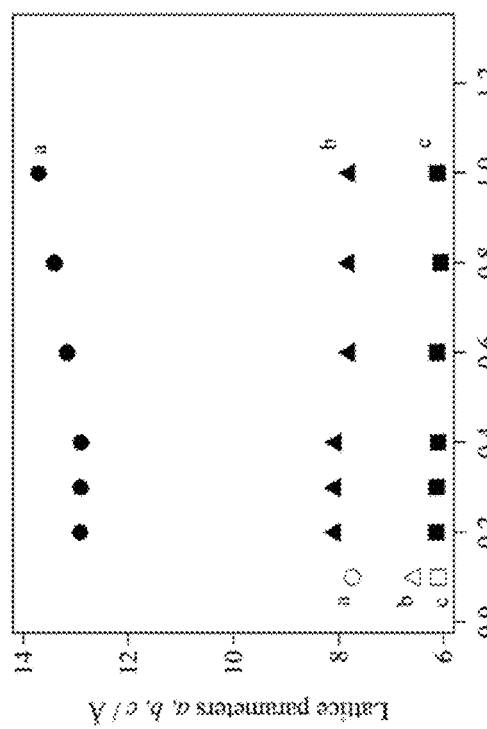
FIGS. 4A and 4B are views illustrating a lattice constant of the lithium ionic conductor (solid electrolyte) according to the present embodiment.

For example, as depicted in FIGS. 4A and 4B, in the case of $Li_{3+3/4x}B_xP_{1-3/4x}S_4$ (x=0.200) whose crystal structure is the β structure at room temperature, the framework structure is β; the space group is Pnma(62); the lengths a, b and c of the axes of a unit cell are 12.9326 Å, 8.07024 Å and 6.13951 Å, respectively; all of the angles α, β and γ between edges are 900; and the volume V is 640.77 $⊂^3$.

Further, in the case of $Li_{3+3/4x}B_xP_{1-3/4x}S_4$ (x=0.300) whose crystal structure is the β structure at room temperature, the framework structure is β; the space group is Pnma(62); the lengths a, b and c of the axes of a unit cell are 12.9183 Å, 8.06803 Å and 6.13573 Å, respectively; all of the angles α, β and γ between edges are 90°; and the volume V is 639.49 Å$^3$.

Further, in the case of $Li_{3+3/4x}B_xP_{1-3/4x}S_4$ (x=0.400) whose crystal structure is the β structure at room temperature, the framework structure is β; the space group is Pnma(62); the lengths a, b and c of the axes of a unit cell are 12.9160 Å, 8.04948 Å and 6.11202 Å, respectively; all of the angles α, β and γ between edges are 900; and the volume V is 635.44 Å$^3$.

Further, in the case of $Li_{3+3/4x}B_xP_{1-3/4x}S_4$ (x=0.600) whose crystal structure is the β structure at room temperature, the framework structure is β; the space group is Pnma(62); the lengths a, b and c of the axes of a unit cell are 13.1729 Å, 7.93478 Å and 6.12905 Å, respectively; all of the angles α, β and γ between edges are 900; and the volume V is 640.63 Å$^3$.

Further, in the case of $Li_{3+3/4x}B_xP_{1-3/4x}S_4$ (x=0.800) whose crystal structure is the β structure at room temperature, the framework structure is β; the space group is Pnma(62); the lengths a, b and c of the axes of a unit cell are 13.4137 Å, 7.80718 Å and 6.06664 Å, respectively; all of the angles α, β and γ between edges are 900; and the volume V is 635.48 Å$^3$.

Further, in the case of $Li_{3+3/4x}B_xP_{1-3/4x}S_4$ (x=1.000) whose crystal structure is the β structure at room temperature, the framework structure is β; the space group is Pnma(62); the lengths a, b and c of the axes of a unit cell are 13.7172 Å, 7.79486 Å and 6.12206 Å, respectively; all of the angles α, β and γ between edges are 900; and the volume V is 654.59 Å$^3$.

In this manner, in the case of $Li_{3+3/4x}B_xP_{1-3/4x}S_4$ ($0.2 \leq x \leq 1.0$) whose crystal structure is the β structure at room temperature, the framework structure is β; the space group is Pnma (62); the lengths a, b and c of the axes of a unit cell are approximately 12.9 to 13.7 Å, approximately 7.8 to 8.0 Å and approximately 6.1 Å, respectively; all of the angles α, β and γ between edges are 900; and the volume V is approximately 635 to 655 Å³.

It is to be noted that, in the case of $Li_{3+3/4x}B_xP_{1-3/4x}S_4$ (x=0.100) whose crystal structure is the γ structure at room temperature, the framework structure is γ; the space group is Pmn2₁(31); the lengths a, b and c of the axes of a unit cell are 7.74018 Å, 6.054940 Å and 6.10478 Å, respectively; all of the angles α, β and γ between edges are 90°; and the volume V is 309.47 Å³.

Further, as described above, the constituent elements are lithium (Li), phosphorus (P), boron (B) and sulfur (S), and a rare and expensive metalloid element such as, for example, Ge is not used. Therefore, the fabrication cost can be decreased and the solid electrolyte (lithium ionic conductor) 3 can be implemented at a low cost. This is particularly effective for suppression of the fabrication cost of an all-solid lithium secondary battery with upsizing taken into consideration. On the other hand, in the case of the solid electrolyte (lithium ionic conductor) 3 to which Ge is added using, for example, $Li_3PS_4$ as a basic component, it has been reported that it indicates an ionic conductivity (bulk impedance) of, for example, approximately $10^3$ S/cm. However, since Ge is a rare and expensive metalloid element, this increases the fabrication cost.

Further, since boron (B) that is a lighter element than phosphorus (P) is substituted for phosphorus (P) as described above, decrease of the weight of the solid electrolyte (lithium ionic conductor) 3 can be achieved. For example, where a large-size battery is incorporated in a moving body such as an electric automobile, it is a significant benefit that the weight of the constituent materials of the battery can be decreased.

In this manner, in order to configure the solid electrolyte (lithium ionic conductor) 3 so as to have, as a mother structure, the β structure that is one of polymorphic crystal structures of $Li_3PS_4$ and indicates a high ionic conductivity and besides to configure the solid electrolyte (lithium ionic conductor) 3 by a light weight at a low cost while the β structure remains existing in stability, the solid electrolyte (lithium ionic conductor) 3 is configured as a solid solution system in which boron (B) is substituted for part of phosphorus (P) of $Li_3PS_4$.

Accordingly, the lithium ionic conductor and the fabrication method therefor as well as the all-solid lithium secondary battery according to the present embodiment are advantageous in that the lithium ionic conductor in which the crystal structure of $Li_3PS_4$ at room temperature is the β structure having a high ionic conductivity, namely, the solid electrolyte 3 of the all-solid lithium secondary battery, can be implemented, and that the ionic conductivity at room temperature of the lithium ionic conductor, namely, the ionic conductivity of the solid electrolyte 3 of the all-solid lithium secondary battery, can be improved to reduce the internal resistance of the all-solid lithium secondary battery thereby to improve an output characteristic (load characteristic) of the all-solid lithium secondary battery.

It is to be noted that the present invention is not limited to the configuration described in the foregoing description of the embodiment and various modifications can be made without departing from the spirit and scope of the present invention.

For example, while, in the embodiment described above, the solid electrolyte (lithium ionic conductor) 3 having such a crystal structure as described above has a composition represented by $Li_{3+3/4x}B_xP_{1-3/4x}S_4$ (0.2≤x≤1.0) based on the powder X-ray diffraction data (refer to FIG. 6) in the examples hereinafter described, the present invention is not limited to this.

In particular, when the solid electrolyte (lithium ionic conductor) 3 is fabricated by the fabrication method of the embodiment described above, ionic conductivity data (refer to FIG. 9) of the examples hereinafter described indicates that, if the solid electrolyte (lithium ionic conductor) 3 is configured so as to have a composition represented by $Li_{3+3/4x}B_xP_{1-3/4x}S_4$ (0.155≤x≤1.300), then a high ionic conductivity at room temperature can be implemented and the ionic conductivity at room temperature can be improved to decrease the internal resistance of the all-solid lithium secondary battery thereby to improve an output characteristic. In particular, if a lithium ionic conductor having a composition represented by $Li_{3+3/4x}B_xP_{1-3/4x}S_4$ (0.155≤x≤1.300) is fabricated by mixing lithium (Li), phosphorus (P), boron (B) and sulfur (S), melting the mixture by heating, cooling the mixture to form a burned body, reducing the burned body to powder and then burning the powder again at a temperature at which the powder does not melt, then the lithium ionic conductor comes to have a high ionic conductivity at room temperature. Consequently, the ionic conductivity of the lithium ionic conductor at room temperature can be improved to reduce the internal resistance of the all-solid lithium secondary battery thereby to improve an output characteristic of the all-solid lithium secondary battery. Preferably, the lithium ionic conductor is configured so as to have a composition represented by $Li_{3+3/4x}B_xP_{1-3/4x}S_4$ (0.155≤x≤1.000). Particularly, based on the ionic conductivity data (refer to FIG. 9) of the examples hereinafter described, it is preferable to configure the lithium ionic conductor so as to have a composition represented by $Li_{3+3/4x}B_xP_{1-3/4x}S_4$ (0.155≤x≤0.800), and, more particularly, the lithium ionic conductor is configured so as to have a composition represented by $Li_{3+3/4x}B_xP_{1-3/4x}S_4$ (0.300≤x≤0.500)

EXAMPLES

The embodiment is described in more detail with regard to the examples thereof. However, the present invention is not limited to the examples described below.

[Synthesis Method for Solid Electrolyte (Lithium Ionic Conductor)]

First, lithium sulfide ($Li_2S$), phosphorus pentasulfide ($P_2S_5$), boron (B) and sulfur (S) were mixed using an agate mortar in a glove box to perform pellet molding.

Then, the mixture produced by the pellet molding was encapsulated under reduced pressure into a quartz tube having an inner face covered with glassy carbon and then heated at approximately 700° C., which is a temperature at which the mixture is melted, and kept at the temperature for approximately four hours. Then, the mixture was naturally cooled to room temperature to obtain a burned body (burned sample).

Then, the burned body obtained in such a manner as just described was reduced to powder for approximately 90 minutes using a vibrating cup mill, and the power was molded by uniaxial press again. Then, the molded burned body was encapsulated under reduced pressure and then burned for approximately 8 hours at approximately 550° C. that is a temperature at which the burned body does not melt thereby to obtain a solid electrolyte (lithium ionic conductor).

Example 1

Based on the composition ratio where x=0.200 in a $Li_{3+3/4x}B_xP_{1-3/4x}S_4$ solid solution system, the weighing values of lithium sulfide ($Li_2S$), phosphorus pentasulfide ($P_2S_5$), boron (B) and sulfur (S) were set to 3.2428 g, 4.2309 g, 0.0973 g and 0.4309 g, respectively, as depicted in FIG. 5, and were mixed. Then, a solid electrolyte (lithium ionic conductor) was obtained by the synthesis method described above. It is to be noted that, since x is a composition ratio of boron (B) and indicates an amount by which boron (B) is substituted for phosphorus (P), x is indicated as B substitution amount in FIG. 5.

Example 2

Based on the composition ratio where x=0.250 in a $Li_{3+3/4x}B_xP_{1-3/4x}S_4$ solid solution system, the weighed values of lithium sulfide ($Li_2S$), phosphorus pentasulfide ($P_2S_5$), boron (B) and sulfur (S) were set to 3.2857 g, 4.0533 g, 0.1217 g and 0.5410 g, respectively, as depicted in FIG. 5, and were mixed. Then, a solid electrolyte (lithium ionic conductor) was obtained by the synthesis method described above.

Example 3

Based on the composition ratio where x=0.300 in a $Li_{3+3/4x}B_xP_{1-3/4x}S_4$ solid solution system, the weighed values of lithium sulfide ($Li_2S$), phosphorus pentasulfide ($P_2S_5$), boron (B) and sulfur (S) were set to 3.3330 g, 3.8747 g, 0.1481 g and 0.6490 g, respectively, as depicted in FIG. 5, and were mixed. Then, a solid electrolyte (lithium ionic conductor) was obtained by the synthesis method described above.

Example 4

Based on the composition ratio where x=0.400 in a $Li_{3+3/4x}B_xP_{1-3/4x}S_4$ solid solution system, the weighed values of lithium sulfide ($Li_2S$), phosphorus pentasulfide ($P_2S_5$), boron (B) and sulfur (S) were set to 3.4231 g, 3.5128 g, 0.1953 g and 0.8688 g, respectively, as depicted in FIG. 5, and were mixed. Then, a solid electrolyte (lithium ionic conductor) was obtained by the synthesis method described above.

Example 5

Based on the composition ratio where x=0.600 in a $Li_{3+3/4x}B_xP_{1-3/4x}S_4$ solid solution system, the weighed values of lithium sulfide ($Li_2S$), phosphorus pentasulfide ($P_2S_5$), boron (B) and sulfur (S) were set to 3.6095 g, 2.7818 g, 0.2954 g and 1.3138 g, respectively, as depicted in FIG. 5, and were mixed. Then, a solid electrolyte (lithium ionic conductor) was obtained by the synthesis method described above.

Example 6

Based on the composition ratio where x=0.800 in a $Li_{3+3/4x}B_xP_{1-3/4x}S_4$ solid solution system, the weighed values of lithium sulfide ($Li_2S$), phosphorus pentasulfide ($P_2S_5$), boron (B) and sulfur (S) were set to 3.7965 g, 2.0424 g, 0.3960 g and 1.7660 g, respectively, as depicted in FIG. 5, and were mixed. Then, a solid electrolyte (lithium ionic conductor) was obtained by the synthesis method described above.

Example 7

Based on the composition ratio where x=1.000 in a $Li_{3+3/4x}B_xP_{1-3/4x}S_4$ solid solution system, the weighed values of lithium sulfide ($Li_2S$), phosphorus pentasulfide ($P_2S_5$), boron (B) and sulfur (S) were set to 3.9875 g, 1.2864 g, 0.5006 g and 2.2268 g, respectively, as depicted in FIG. 5, and were mixed. Then, a solid electrolyte (lithium ionic conductor) was obtained by the synthesis method described above.

Comparative Example 1

Based on the composition ratio where x=0.100 in a $Li_{3+3/4x}B_xP_{1-3/4x}S_4$ solid solution system, the weighed values of lithium sulfide ($Li_2S$), phosphorus pentasulfide ($P_2S_5$), boron (B) and sulfur (S) were set to 3.1533 g, 4.5868 g, 0.0481 g and 0.2143 g, respectively, as depicted in FIG. 5, and were mixed. Then, a solid electrolyte (lithium ionic conductor) was obtained by the synthesis method described above.

Comparative Example 2

Based on the composition ratio where x=0.150 in a $Li_{3+3/4x}B_xP_{1-3/4x}S_4$ solid solution system, the weighed values of lithium sulfide ($Li_2S$), phosphorus pentasulfide ($P_2S_5$), boron (B) and sulfur (S) were set to 3.194 g, 4.4069 g, 0.0728 g and 0.3225 g, respectively, as depicted in FIG. 5, and were mixed. Then, a solid electrolyte (lithium ionic conductor) was obtained by the synthesis method described above.

Comparative Example 3

Based on the composition ratio where x=1.333 in a $Li_{3+3/4x}B_xP_{1-3/4x}S_4$ solid solution system, the weighed values of lithium sulfide ($Li_2S$), phosphorus pentasulfide ($P_2S_5$), boron (B) and sulfur (S) were set to 4.3142 g, 0 g, 0.6774 g and 3.0135 g, respectively, as depicted in FIG. 5, and were mixed. Then, a solid electrolyte (lithium ionic conductor) was obtained by the synthesis method described above.

[Evaluation of Solid Electrolyte (Lithium Ionic Conductor)]

First, powder X-ray diffraction measurement was performed to evaluate the crystal structure of the solid electrolytes (lithium ionic conductors) of the examples 1 to 7 and the comparative examples 1 to 3 obtained in such a manner as described above and evaluate the temperature dependency of the crystal structure (β phase) of the solid electrolyte (lithium ionic conductor) of the example 3.

Here, as the powder X-ray diffraction measurement, laboratory X-ray diffraction measurement was performed for the solid electrolytes (lithium ionic conductors) of the examples 1 to 7 and the comparative examples 1 to 3 and synchrotron X-ray diffraction measurement was performed for the solid electrolyte (lithium ionic conductor) of the example 3.

First, in the laboratory X-ray diffraction measurement, a RINT [output voltage (tube voltage) 40 kv, output current (tube current) 30 mA] by Rigaku was used as the apparatus, and the measurement range was set to 10°≤2θ≤60° and the measurement temperature was set to 27° C. (room temperature). Then, successive measurement was performed at a scanning speed 1.2°/min. As a result, such a diffraction diagram (data) as depicted in FIG. 6 was obtained.

Figure 6:
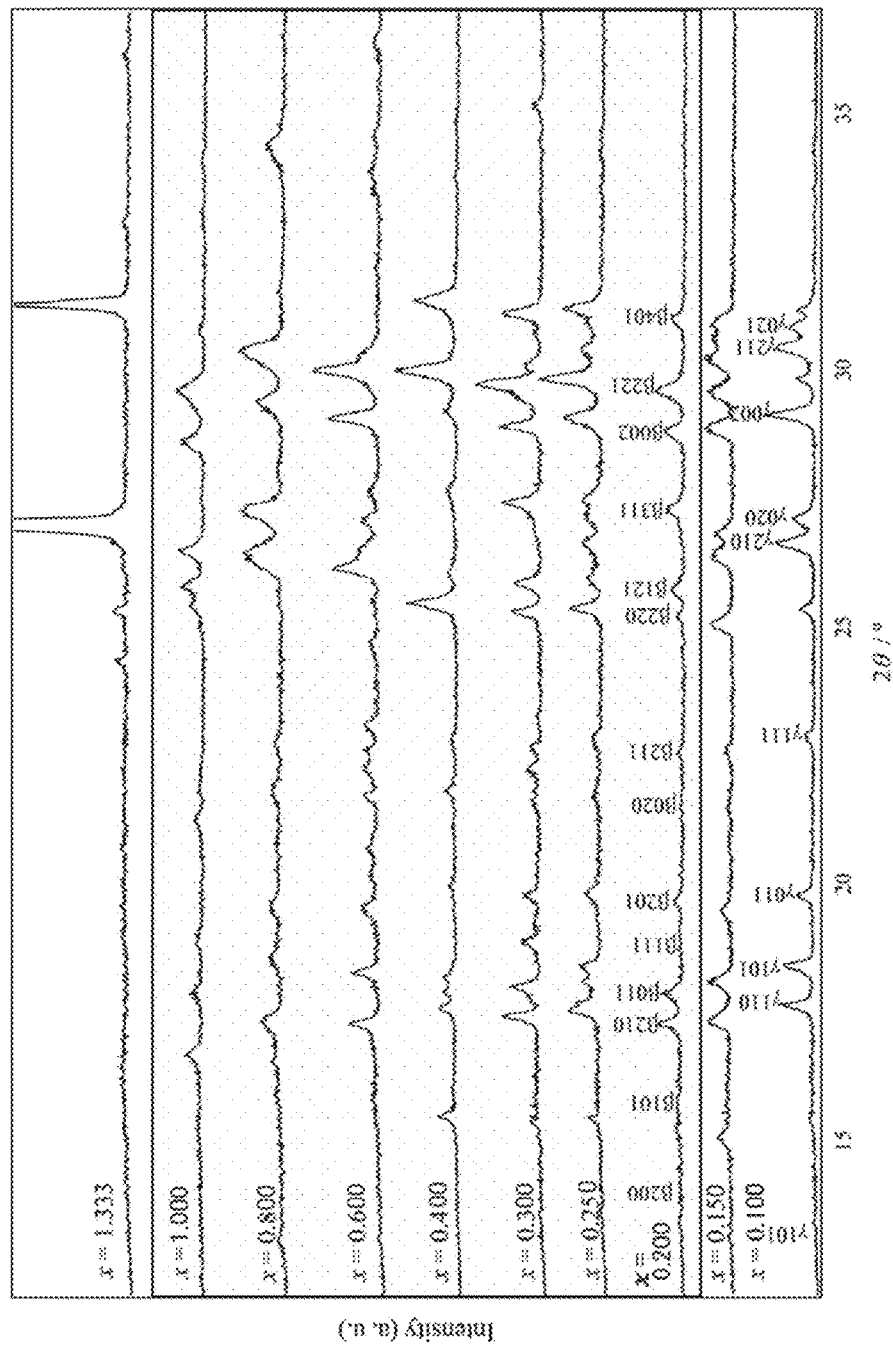
FIG. 6 is a view depicting diffraction patterns obtained by powder X-ray diffraction measurement at room temperature of the lithium ionic conductors (solid electrolytes) of the examples and the comparative examples.

Here, FIG. 6 depicts diffraction diagrams obtained by the laboratory X-ray diffraction measurement at room temperature (here, at approximately 27° C.) where x=0.100, 0.150, 0.200, 0.250, 0.300, 0.400, 0.600, 0.800, 1.000 and 1.333 in the $Li_{3+3/4x}B_xP_{1-3/4x}S_4$ solid solution system.

As depicted in FIG. 6, where x=0.100 and 0.150 (comparative examples 1 and 2), the $Li_{3+3/4x}B_xP_{1-3/4x}S_4$ solid solution system has the γ structure while, where x=0.200, 0.250, 0.300, 0.400, 0.600, 0.800 and 1.000 (examples 1 to 7), the $Li_{3+3/4x}B_xP_{1-3/4x}S_4$ solid solution system has the β structure. Further, where x=1.333 (comparative example 3), the $Li_{3+3/4x}B_xP_{1-3/4x}S_4$ solid solution system has a structure other than the γ structure and the β structure. In other words, the crystal phase changed from the γ phase to the β phase between x=0.150 and x=0.200, and the crystal phase changed from the β phase to some different phase between x=1.000 and x=1.333.

In this manner, the solid electrolytes (lithium ionic conductors) of the examples 1 to 7 obtained by the synthesis method described above had the β structure at room temperature with boron (B) substituted for part of phosphorus (P) in the crystal structure of $Li_3PS_4$. Then, the composition of the solid electrolytes (lithium ionic conductors) which indicate the β structure at room temperature with boron (B) substituted for part of phosphorus (P) in the crystal structure of $Li_3PS_4$ is represented by $Li_{3+3/4x}B_xP_{1-3/4x}S_4$ (0.2≤x≤1.0) based on the powder X-ray diffraction data depicted in FIG. 6.

Then, in the synchrotron X-ray diffraction measurement, radiation light facilities SPring-8 and a beam line BL19B2 were used, and the wavelength was set to 0.6 Å and the measurement temperature range was set to −180° C. to 300° C. Then, the measurement was performed, and such diffraction diagrams (diffraction data) as depicted in FIG. 7 were obtained by the measurement.

Figure 7:
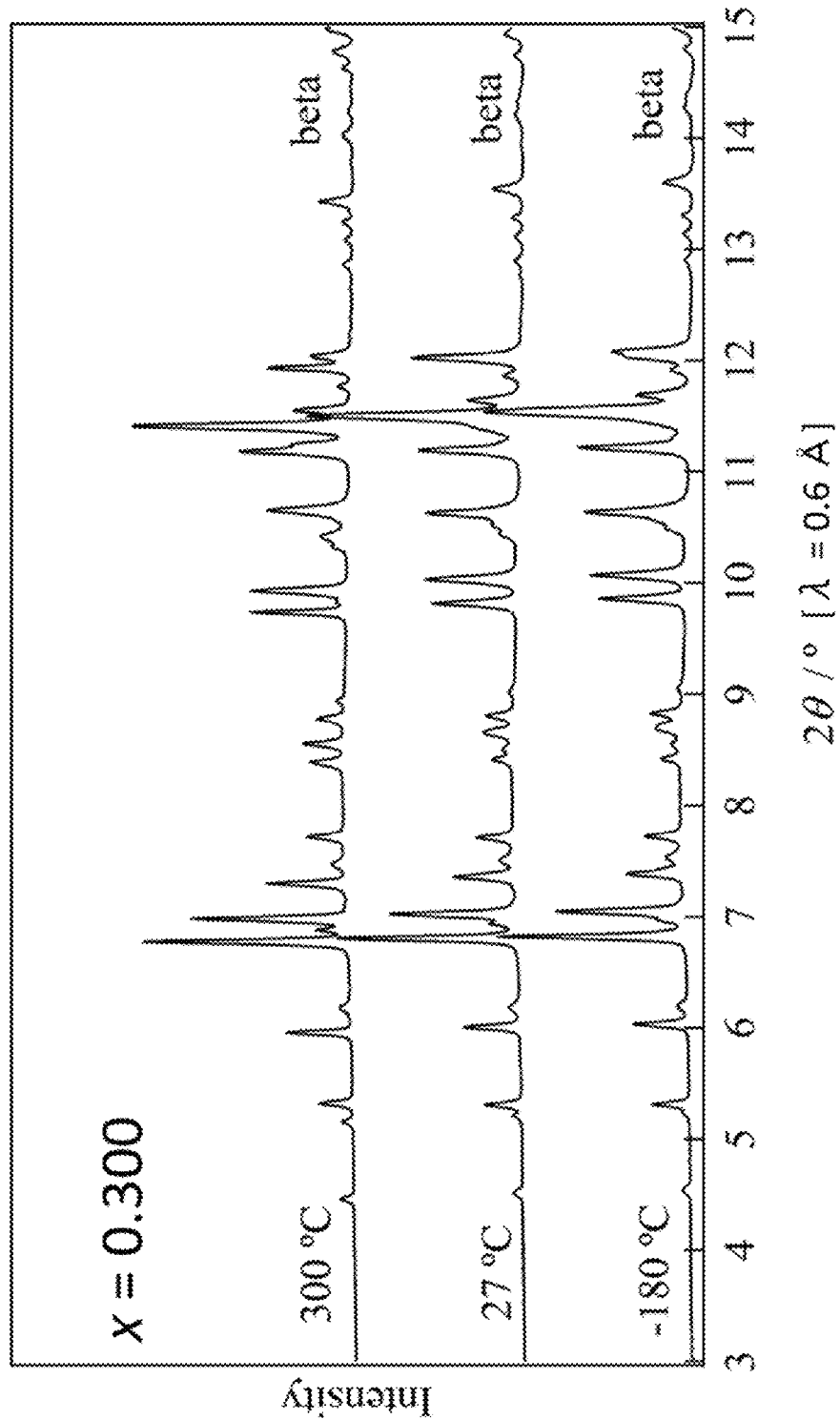
FIG. 7 is a view depicting diffraction patterns obtained by synchrotron X-ray diffraction measurement for evaluating a temperature dependency of the β structure of the lithium ionic conductor (solid electrolyte) according to the third example.

Here, FIG. 7 depicts diffraction diagrams obtained by setting x in the $Li_{3+3/4x}B_xP_{1-3/4x}S_4$ solid solution system to x=0.3 (example 3), changing the temperature (here, to −180° C., 27° C. and 300° C.) and performing synchrotron X-ray diffraction measurement.

As depicted in FIG. 7, the diffraction diagrams that indicated the β structure were not different from each other at any temperature and exhibited no phase change by a temperature variation. In particular, the β structure existed in stability at all of the low temperature (here, −180° C.), the room temperature (here, 27° C.) and the high temperature (here, 300° C.).

Then, ionic conductivity measurement was performed, and the ionic conductivity of the solid electrolytes (lithium ionic conductors) of the examples 1 to 7 and the comparative examples 1 to 3 obtained in such a manner as described above was evaluated.

The evaluation of the ionic conductivity was performed using an alternating current impedance method.

In particular, the solid electrolytes (lithium ionic conductors) of the examples 1 to 7 and the comparative examples 1 to 3 described above were attached to an electrochemical cell having jigs [here, the upper side and the lower side indicate an electrode terminal (+) and an electrode terminal (−), respectively] of 10 mmφ for which an SKD 11 was used as a material. Further, the AUTOLAB FRA (frequency response analysis apparatus) of Metrohm Autolab was used as the evaluation apparatus. Then, the impedance was measured by setting the application voltage to 0.1 V, the frequency response region to 1 MHz to 1 Hz and the measurement temperature to 27° C.

Figure 8:
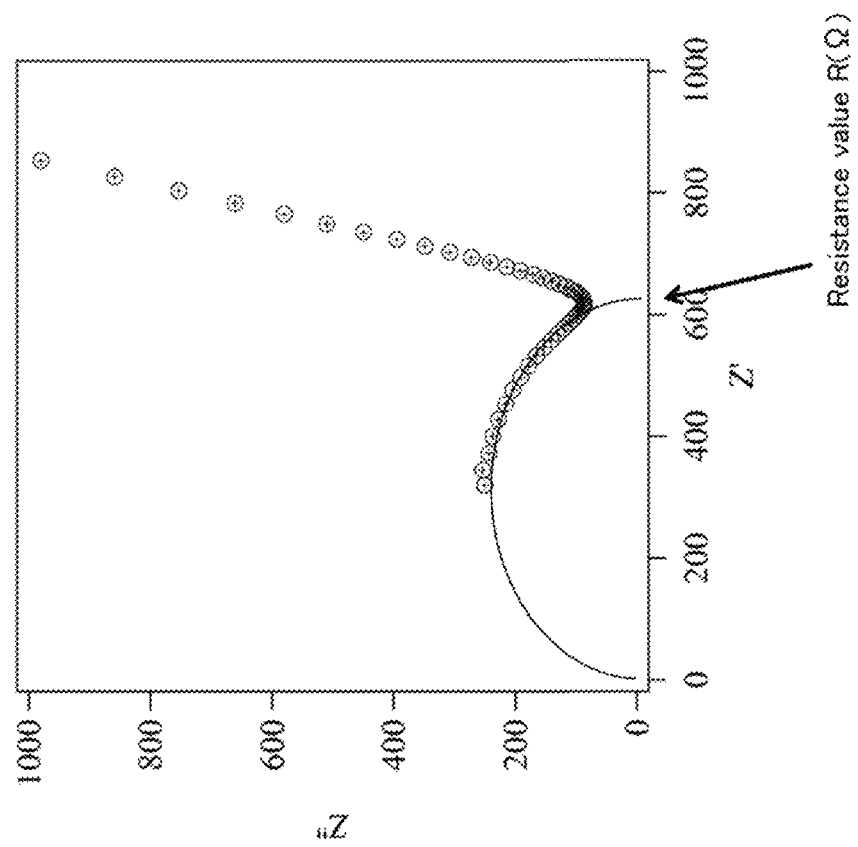
FIG. 8 is a view illustrating a calculation method for an ionic conductivity of the lithium ionic conductors (solid electrolytes) of the examples and the comparative examples.

Then, one half arc was extrapolated into the measured data of the impedance as depicted in FIG. 8 and then the ionic conductivity was calculated using a crossing point of the right end with the Z' axis as a grain boundary resistance. Here, the thickness of the solid electrolyte (lithium ionic conductor) was represented by t (cm); the area of the jig used for the measurement by S ($cm^2$); and the resistance value of the grain boundary resistance was by R (Ω). Then, the ionic conductivity σ (S/cm) was calculated in accordance with the following expression:

$$t\,(cm)/R\,(\Omega)/S\,(cm^2)=\sigma\,(1/\Omega\cdot cm)=\sigma\,(S/cm)$$

Figure 9:
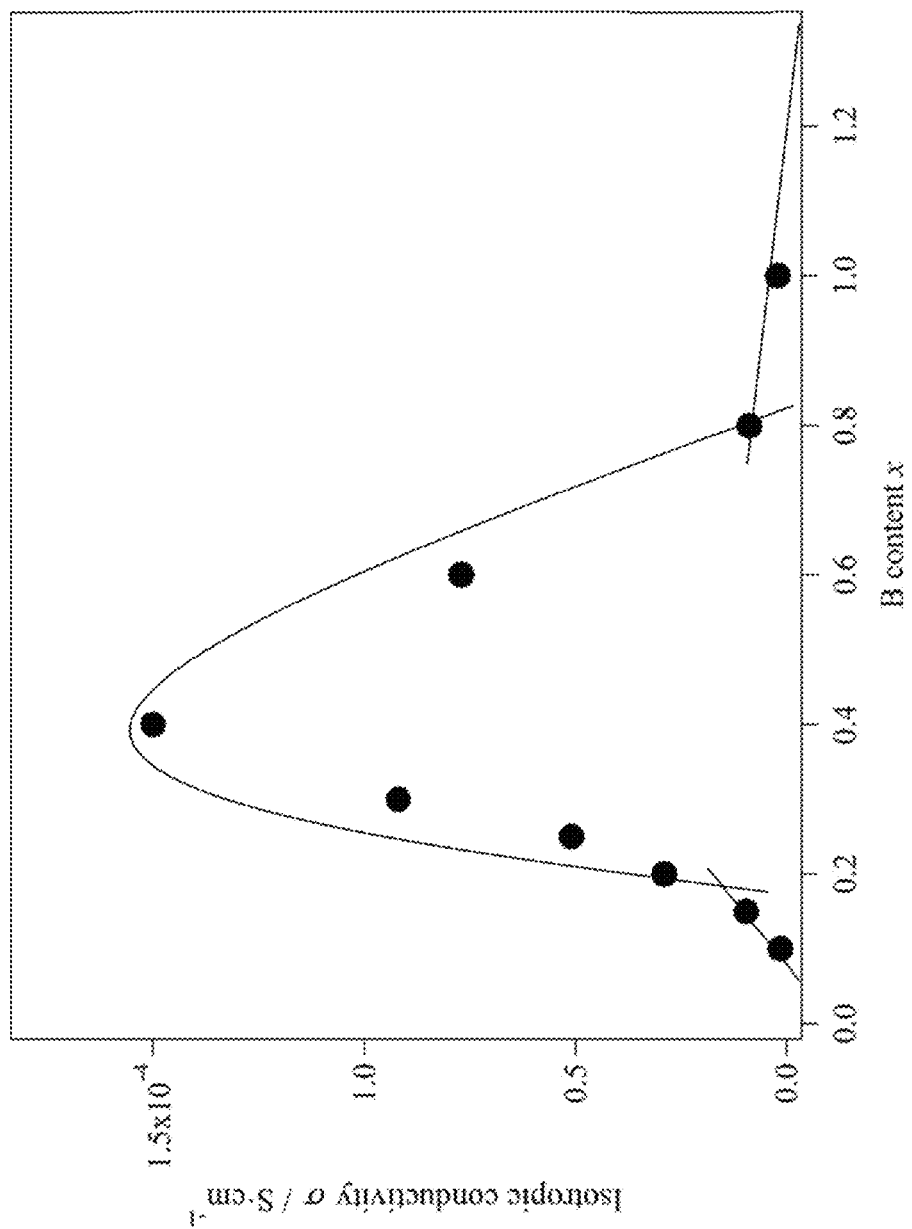
FIG. 9 is a view depicting an ionic conductivity at room temperature of the lithium ionic conductors (solid electrolytes) of the examples and the comparative examples.

Here, FIG. 9 indicates ionic conductivity data at room temperature (here, at approximately 27° C.) where x of the $Li_{3+3/4x}B_xP_{1-3/4x}S_4$ solid solution system was set to x=0.100, 0.150, 0.200, 0.250, 0.300, 0.400, 0.600, 0.800 and 1.000.

As depicted in FIG. 9, where x=0.100 (comparative example 1), the ionic conductivity is $1.4\times10^{-6}$ S/cm, and where x=0.150 (comparative example 2), the ionic conductivity is $9.6\times10^{-6}$ S/cm. Within the range between the specific ionic conductivities, the ionic conductivity varies linearly and can be approximated by a linear line.

Meanwhile, where x=0.200 (example 1), the ionic conductivity is $2.9\times10^{-5}$ S/cm and, where x=0.250 (example 2), the ionic conductivity is $5.1\times10^{-5}$ S/cm. Where x=0.300 (example 3), the ionic conductivity is $9.2\times10^{-5}$ S/cm and, where x=0.400 (example 4), the ionic conductivity is $1.5\times10^{-4}$ S/cm. Where x=0.600 (example 5), the ionic conductivity is $7.7\times10^{-5}$ S/cm and, where x=0.800 (example 6), the ionic conductivity is $8.8\times10^{-6}$ S/cm. Within the range defined by the ionic conductivities mentioned, the ionic conductivity varies non-linearly and can be approximated by a curve. The crossing point between the curve and the linear line described above is x=0.155.

On the other hand, where x=0.800 (example 6), the ionic conductivity is $8.8\times10^{-6}$ S/cm and, where x=1.000 (example 7), the ionic conductivity is $2.1\times10^{-6}$ S/cm. Within the range between the ionic conductivities, the ionic conductivity varies linearly and can be approximated by a linear line. The crossing point between the linear line and the transverse axis is x=1.300. Further, the crossing point between the linear line and the curve described hereinabove is x=0.800.

It is to be noted that, actually, where x was set lower than 0.100, since the ionic conductivity was lower than $10^{-6}$ S/cm, no data is plotted in FIG. 9. Further, where x was set higher than 1.300, since no ionic conductivity was indicated, no data is plotted in FIG. 9.

For example, although $Li_3PS_4$ is included in a case in which x is lower than 0.100, the ionic conductivity at room temperature is lower than $10^{-6}$ S/cm. Further, although $Li_3BS_3$ is included in a case in which x is higher than 1.300, no ionic conductivity is indicated at room temperature.

In this manner, where x is equal to or higher than 0.155 but equal to or lower than 1.300, namely, in the solid electrolytes (lithium ionic conductors) of the examples 1 to 7 obtained by the synthesis method described above, the ionic conductivity at room temperature is high in comparison with those of $Li_3PS_4$ or $Li_3BS_3$. Therefore, the ionic conductivity is improved. In other words, where x is equal to or higher than 0.155 but equal to or lower than 1.300, namely, in the solid electrolytes (lithium ionic conductors) of the examples 1 to 7 obtained by the synthesis method described above, the crystal structure having a conductive path along which lithium ions are likely to pass in comparison with that of $Li_3PS_4$ or $Li_3BS_3$ is constructed. Therefore, the ionic conductivity is improved. In this case, the composition of the solid electrolyte (lithium ionic conductor) is represented by $Li_{3+3/4x}B_xP_{1-3/4x}S_4$ (0.155≤x≤1.300) based on the ionic conductivity data depicted in FIG. 9. Preferably, the composition of the solid electrolyte (lithium ionic conductor) is set to $Li_{3+3/4x}B_xP_{1-3/4x}S_4$ (0.155≤x≤1.000).

Especially, if x is set equal to or higher than 0.155 but equal to or lower than 0.800, then the ionic conductivity at room temperature suddenly increases significantly and the ionic conductivity is improved. Therefore, it is preferable to set x equal to or higher than 0.155 but equal to or lower than 0.800. In particular, preferably the solid electrolyte (lithium ionic conductor) is configured so as to have a composition represented by $Li_{3+3/4x}B_xP_{1-3/4x}S_4$ (0.155≤x≤0.800). Further, if x is set equal to or higher than 0.300 but equal to or lower than 0.500, then the ionic conductivity at room temperature becomes approximately $10^{-4}$ S/cm and the ionic conductivity is improved. Therefore, it is more preferable to set x equal to or higher than 0.300 but equal to or lower than 0.500. In particular, the solid electrolyte (lithium ionic conductor) is more preferably configured so as to have a composition represented by $Li_{3+3/4x}B_xP_{1-3/4x}S_4$ (0.300≤x≤0.500).

It is to be noted that the ionic conductivity of those solid electrolytes (lithium ionic conductors) in which the crystal orientations of the a, b and c axes are not uniformly directed (powder) although, based on the powder X-ray diffraction data (refer to FIG. 6) described above, they have the β structure, namely, they have one-dimensional conductive paths (anisotropic conductive paths) only along the b-axis direction of the crystal structure, was calculated and is depicted in FIG. 9. Therefore, in some crystal structure, the conductive paths are not uniformly directed in the one axis and lithium ions that pass along conductive paths of the solid electrolyte (lithium ionic conductor) having the β structure are observed in the directions of the a, b and c axes (namely, isotropically) and, based on the powder X-ray diffraction data (refer to FIG. 6) described above, the ionic conductivity is lower than that of a crystal structure having the γ structure. However, where the solid electrolyte (lithium ionic conductor) is used actually for the all-solid lithium secondary battery, it is formed as an oriented film such that one-dimensional conductive paths extending only in the direction of the b axis of the crystal structure are uniformly directed in the one axis. The ionic conductivity of the solid electrolyte (lithium ionic conductor) having the β structure formed as an oriented film in this manner improves by approximately 5 times in comparison with that of the ionic conductivity data depicted in FIG. 9. On the other hand, the solid electrolyte (lithium ionic conductor) having the γ structure has no anisotropic conductive path, and therefore, even if it is formed as an oriented film, the ionic conductivity does not improve. Accordingly, even if, in the ionic conductivity data depicted in FIG. 9, the ionic conductivity of the solid electrolyte (lithium ionic conductor) having the β structure is lower than that of the solid electrolyte having the γ structure based on the powder X-ray diffraction data (refer to FIG. 6) described above, where the solid electrolyte (lithium ionic conductor) is used actually for the all-solid lithium secondary battery, the solid electrolyte (lithium ionic conductor) having the β structure based on the powder X-ray diffraction data (refer to FIG. 6) described above indicates a higher ionic conductivity than that of the solid electrolyte having the γ structure.

[Fabrication Method for all-Solid Lithium Secondary Battery]

First, $LiCoO_2$ and a solid electrolyte material (here, that of the example 3) synthesized in such a manner as described above were mixed at a ratio of 6:4 to produce the positive electrode 1.

Further, Li—Al and the solid electrolyte material (here, that of the example 3) synthesized in such a manner as described above were mixed at a ratio of 7:3 to produce the negative electrode 2.

As depicted in FIGS. 10A and 10B, the negative electrode 2, solid electrolyte (here, that of the example 3) 3 synthesized in such a manner as described above and positive electrode 1 were stacked in order between jigs 11 of 10 mmφ provided in an electrochemical cell 10 and then pressurized to fabricate the all-solid lithium secondary battery. It is to be noted that reference numeral 12 in FIGS. 10A and 10B denotes a cell (cell shell).

[Evaluation of all-Solid Lithium Secondary Battery]

Charging and discharging evaluation of the all-solid lithium secondary battery fabricated in such a manner as described above was performed.

Figure 11:
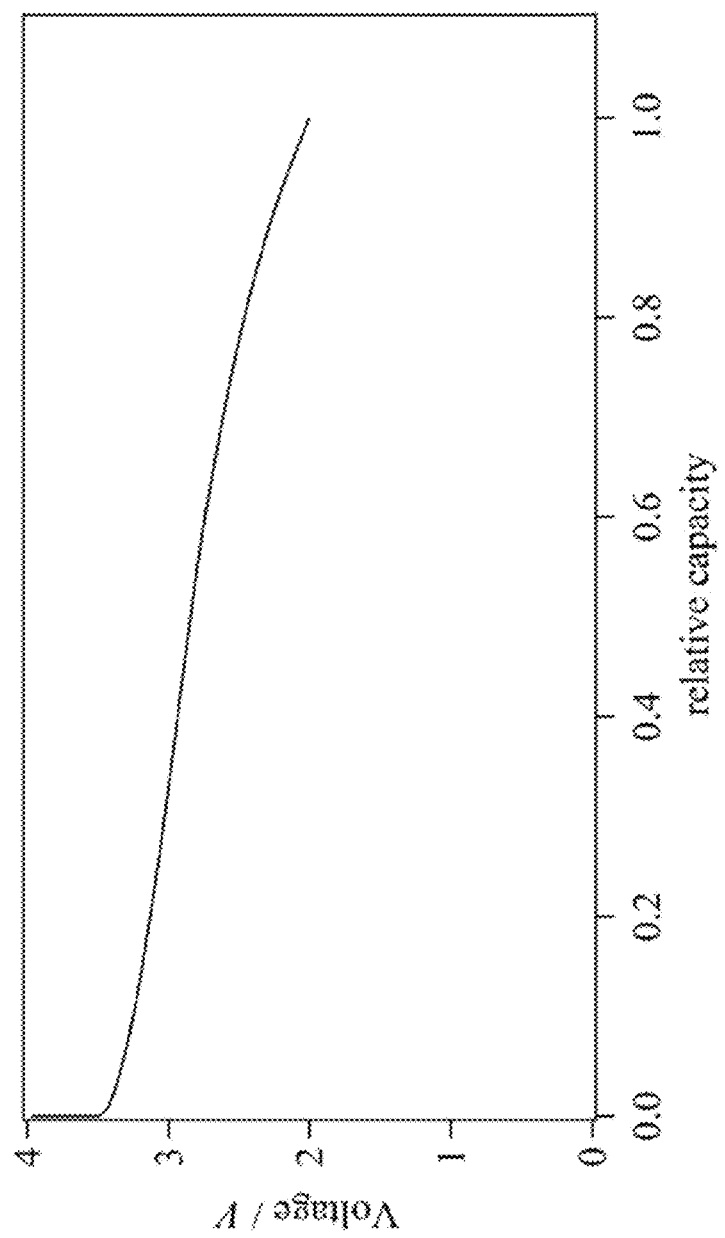
FIG. 11 is a view depicting a discharging curve of the all-solid lithium secondary batteries of the examples.

In the all-solid lithium secondary battery fabricated in such a manner as described above, namely, in the all-solid lithium secondary battery including the solid electrolyte (here, that of the example 3) 3 synthesized in such a manner as described above, battery operation can be confirmed at room temperature. Thus, such a discharging curve as depicted in FIG. 11 was obtained, and a good load characteristic (output characteristic) was obtained.

On the other hand, an all-solid lithium secondary battery including a solid electrolyte formed from $Li_3PS_4$ or $Li_3BS_3$ (comparative example 3) or solid electrolytes (those of the comparative examples 1 and 2) having the γ structure was fabricated and charging and discharging evaluation was performed. According to the evaluation, the all-solid lithium secondary batteries did not operate. In particular, the all-solid lithium secondary battery including the solid electrolyte formed from $Li_3PS_4$ or $Li_3BS_3$ (comparative example 3) or the solid electrolyte (that of the comparative example 1 or 2) having the γ structure has an excessively high internal resistance and therefore does not operate as a battery, resulting in failure to obtain a discharging curve.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A lithium ionic conductor, comprising lithium (Li), phosphorus (P), boron (B) and sulfur (S) as constituent elements and comprising a crystal structure that boron (B) is substituted for part of phosphorus (P) in a β structure of $Li_3PS_4$.

2. The lithium ionic conductor according to claim 1, wherein a composition of the lithium ionic conductor is represented by $Li_{3+3/4x}B_xP_{1-3/4x}S_4$ (0.2≤x≤1.0).

3. The lithium ionic conductor according to claim 1, wherein the β structure of $Li_3PS_4$ is a crystal structure in which six-coordinated octahedrons centering on lithium (Li) are located in such a manner as to share an edge.

4. The lithium ionic conductor according to claim 1, wherein the β structure of $Li_3PS_4$ is a crystal structure in which one half of apexes of a plurality of four-coordinated tetrahedrons centering on boron (B) or phosphorus (P) face an opposite direction in a unit cell.

5. The lithium ionic conductor according to claim 1, wherein the β structure of $Li_3PS_4$ is a crystal structure in which a four-coordinated tetrahedron centering on boron (B) or phosphorus (P) and a four-coordinated tetrahedron centering on lithium (Li), a four-coordinated tetrahedron centering on boron (B) or phosphorus (P) and a six-coordinated octahedron centering on lithium (Li), and a four-coordinated tetrahedron centering on lithium (Li) and a six-coordinated octahedron centering on lithium (Li) are located in such a manner as to share an edge.

6. An all-solid lithium secondary battery, comprising:
   a positive electrode;
   a negative electrode; and
   a solid electrolyte provided between the positive electrode and the negative electrode, and containing lithium (Li), phosphorus (P), boron (B) and sulfur (S) as constituent elements, the solid electrolyte having a crystal structure that boron (B) is substituted for part of phosphorus (P) in a β structure of $Li_3PS_4$.

7. The all-solid lithium secondary battery according to claim 6, wherein the solid electrolyte has a composition represented by $Li_{3+3/4x}B_xP_{1-3/4x}S_4$ (0.2≤x≤1.0).

8. The all-solid lithium secondary battery according to claim 6, wherein the β structure of $Li_3PS_4$ is a crystal structure in which six-coordinated octahedrons centering on lithium (Li) are located in such a manner as to share an edge.

9. The all-solid lithium secondary battery according to claim 6, wherein the β structure of $Li_3PS_4$ is a crystal structure in which one half of apexes of a plurality of four-coordinated tetrahedrons centering on boron (B) or phosphorus (P) face an opposite direction in a unit cell.

10. The all-solid lithium secondary battery according to claim 6, wherein the β structure of $Li_3PS_4$ is a crystal structure in which a four-coordinated tetrahedron centering on boron (B) or phosphorus (P) and a four-coordinated tetrahedron centering on lithium (Li), a four-coordinated tetrahedron centering on boron (B) or phosphorus (P) and a six-coordinated octahedron centering on lithium (Li), and a four-coordinated tetrahedron centering on lithium (Li) and a six-coordinated octahedron centering on lithium (Li) are located in such a manner as to share an edge.

11. A fabrication method for a lithium ionic conductor, comprising:
mixing lithium (Li), phosphorus (P), boron (B) and sulfur (S), melting the mixture by heating and then cooling the mixture to form a burned body; and
reducing the burned body to powder and then burning the powder again at a temperature at which the powder does not melt to fabricate a lithium ionic conductor having a crystal structure that boron (B) is substituted for part of phosphorus (P) in a β structure of $Li_3PS_4$.

* * * * *

UNITED STATES PATENT AND TRADEMARK OFFICE
CERTIFICATE OF CORRECTION

| | | |
|---|---|---|
| PATENT NO. | : 9,142,861 B2 | Page 1 of 1 |
| APPLICATION NO. | : 14/170860 | |
| DATED | : September 22, 2015 | |
| INVENTOR(S) | : Kenji Homma et al. | |

It is certified that error appears in the above-identified patent and that said Letters Patent is hereby corrected as shown below:

On the title page Item (56) should read:

-- (56)  References Cited

FOREIGN PATENT DOCUMENTS

JP            2006-68361 A     03/2003...... --

Signed and Sealed this
Fifth Day of April, 2016

Michelle K. Lee
*Director of the United States Patent and Trademark Office*